(12) United States Patent
Tateishi

(10) Patent No.: US 6,642,696 B2
(45) Date of Patent: Nov. 4, 2003

(54) DC-DC CONVERTER WITH A FEEDBACK CONTROLLER

(75) Inventor: Tetsuo Tateishi, Nagoya (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/205,242

(22) Filed: Jul. 25, 2002

(65) Prior Publication Data

US 2003/0034762 A1 Feb. 20, 2003

(30) Foreign Application Priority Data

Aug. 3, 2001 (JP) .......................................... 2001-236693

(51) Int. Cl.$^7$ .............................................. G05F 1/652
(52) U.S. Cl. ........................ 323/222; 323/284; 323/286
(58) Field of Search ................................. 323/222, 282, 323/284, 285, 286

(56) References Cited

U.S. PATENT DOCUMENTS

| | | | |
|---|---|---|---|
| 5,982,160 A | | 11/1999 | Walters et al. |
| 5,999,433 A | * | 12/1999 | Hua et al. .................... 363/132 |
| 6,016,075 A | * | 1/2000 | Hamo ........................ 330/10 |
| 6,191,565 B1 | * | 2/2001 | Lee et al. .................... 323/222 |
| RE37,738 E | * | 6/2002 | Brkovic ....................... 323/222 |
| 6,404,175 B1 | * | 6/2002 | Yang et al. .................. 323/282 |
| 6,437,546 B1 | * | 8/2002 | Kunii et al. ................. 323/222 |
| 6,441,597 B1 | * | 8/2002 | Lethellier ................... 323/282 |

FOREIGN PATENT DOCUMENTS

JP 2000-193687 7/2000

OTHER PUBLICATIONS

A Simple Current–Sense Technique Eliminating a Sense Resistor, Loss–Less Current Sense Technique, LinFinity Application Note AN–7, 07/98, pp. 1–6, LinFinity Microelectronics.

* cited by examiner

Primary Examiner—Bao Q. Vu
(74) Attorney, Agent, or Firm—Bret J. Petersen; W. James Brady, III; Frederick J. Telecky, Jr.

(57) ABSTRACT

A DC-DC converter that does not need a series resistance element on the output side, and can make use of the parasitic resistance of a coil to improve output characteristics and prevent a decrease in efficiency. In switching unit 40, transistors M1 and M2 are turned ON/OFF alternately in correspondence with pulse signal $S_p$; input voltage $V_{in}$ is fed intermittently to node ND1; in output filter unit 10, output voltage $V_{out}$ that is smoothed with coil $L_e$ and capacitor $C_{out}$ is output to terminal $T_{out}$. In feedback control unit 100, divided voltage $V_{o1}$ obtained by dividing the voltage at node ND1 is compared with reference voltage $V_{ref}$, and the result of the comparison is integrated to generate control voltage $V_c$. In PWM modulation unit 30, pulse signal $S_p$ with pulse width controlled is generated according to control voltage $V_c$ and sent to switching unit 40. Consequently, the parasitic resistance of coil $L_e$ of output filter unit 10 is used to perform static load regulation, and it is possible to improve the stability of the output voltage and the conversion efficiency.

18 Claims, 4 Drawing Sheets

DC-DC CONVERTER WITH A FEEDBACK CONTROLLER

FIELD OF THE INVENTION

This invention pertains to DC-DC converters and in particular a DC-DC converter that does not require an external resistor connected to the output side for regulation, and thereby improves transformation efficiency and stability of the output voltage.

BACKGROUND OF THE INVENTION

A DC-DC converter can convert a supplied DC voltage to another constant voltage for the load circuit, independent of variation in the load. Usually, a DC-DC converter of this type generates a feedback control voltage in correspondence with the output voltage, and generates a switching control signal in correspondence with said feedback control voltage, with said switching control signal used in controlling the feed of the DC voltage to the load side so as to stabilize the output voltage.

FIG. 8 is a diagram illustrating an example of the constitution of a conventional voltage-mode DC-DC converter. This DC-DC converter is composed of output filter unit 10, feedback control unit 20, pulse width modulating unit (PWM modulating unit) 30, and switching unit 40.

Switching unit 40 is composed of PMOS transistor M1 and NMOS transistor M2 connected in series between input power source voltage $V_{in}$ and ground potential GND, as well as diode D1. PWM modulation pulse $S_p$ fed from PWM modulation unit 30 is applied to the gates of transistors M1 and M2, respectively. One end of coil $L_e$ of output filter unit 10 is connected to node ND1, which is the point of connection between the drains of transistors M1 and M2.

In switching unit 40, transistors M1 and M2 are controlled to be ON and OFF alternately in correspondence with PWM modulation pulse $S_p$. For example, when PWM modulation pulse $S_p$ is at low level, transistor M1 is ON, while transistor M2 is OFF. Conversely, when PWM modulation pulse $S_p$ is at high level, transistor M1 is OFF, and transistor M2 is ON.

When transistor M1 is ON, current $I_c$ is fed from power source voltage $V_{in}$ to output filter unit 10. When transistor M1 is OFF and transistor M2 is ON, the output current to the load side is maintained by coil $L_e$ provided in output filter unit 10.

Also, diode D1 is arranged to absorb variation in the switching timing of transistors M1 and M2 so as to increase the voltage conversion efficiency.

Output filter unit 10 takes the current fed from switching unit 40 as input, and smoothes said current by means of output capacitor $C_{out}$, and sends output voltage $V_{out}$ to the load.

Feedback control unit 20 generates feedback voltage $V_c$ in correspondence with voltage $V_{out}$ output from output filter unit 10 to the load side, and sends said voltage to PWM modulation unit 30. Feedback control unit 20 is composed of resistance elements R1, R2, R3, capacitor C1, and differential amplifier AMP1. Resistance elements R2 and R3 are connected in series between the output terminal of output voltage $V_{out}$ and ground potential GND, and they divide output voltage $V_{out}$ to generate divided voltage $V_{o1}$. Capacitor C1 and resistance element R1 are connected in series between the inverting input terminal and the output terminal of differential amplifier AMP1.

Voltage $V_{o1}$ is applied to the inverting input terminal of differential amplifier AMP1. Also, a prescribed reference voltage $V_{ref}$ is applied to the non-inverting input terminal of differential amplifier AMP1.

Differential amplifier AMP1 and circuit elements connected to it, such as capacitor C1 and resistance element R1 connected in series between its inverting input terminal and output terminal, form a comparator and an integrator.

That is, the level of the integration voltage of the voltage divider voltage $V_{o1}$ and that of reference voltage $V_{ref}$ are compared with each other in feedback control unit 20, and control voltage (feedback voltage) $V_c$ is output in correspondence with the result of said comparison. Because reference voltage $V_{ref}$ is at a constant level, when divided voltage $V_{o1}$ rises, the voltage level of control voltage $V_c$ falls. Conversely, when divided voltage $V_{o1}$ falls, the voltage level of control voltage $V_c$ rises.

In correspondence with control voltage $V_c$ from feedback control unit 20 and the sawtooth wave generated by sawtooth generator 32, PWM modulation unit 30 generates pulse signal $S_p$ that has its pulse width modulated (PWM modulation pulse), which is sent to switching unit 40.

As shown in the figure, PWM modulation unit 30 is composed of comparator CMP1 and sawtooth wave generator 32. Control voltage $V_c$ is applied to the inverting input terminal of comparator CMP1, and the sawtooth signal generated by sawtooth wave generator 32 is applied to its non-inverting input terminal. If the output ability of comparator CMP1 is insufficient, or if the signal level is not in agreement with that of switching unit 40, one may also add an output driver and a level shift circuit to the output of comparator CMP1.

Pulse signal $S_p$ that has its pulse width modulated in correspondence with control voltage $V_c$ is output from the output terminal of comparator CMP1. Here, assuming the offset voltage of the sawtooth wave generated by sawtooth generator 32 to be constant, when the level of control voltage $V_c$ rises, the pulse width on the positive half of output pulse signal $S_p$ become smaller, while the pulse width on the negative half becomes larger. Conversely, when the level of control voltage $V_c$ falls, the pulse width on the positive half of pulse signal $S_p$ becomes larger, and the pulse width on the negative half becomes smaller.

In the following, we will examine the operation of the feedback control of the DC-DC converter having the aforementioned constitution.

For example, when the level of output voltage $V_{out}$ sent to the load falls due to load variation or the like, divided voltage $V_{o1}$ also falls, and control voltage $V_c$ output from feedback control unit 20 rises. As a result, in PWM modulation unit 30, the pulse width on the positive half of pulse signal $S_p$ becomes smaller, while the pulse width on the negative half becomes larger.

In switching unit 40, when pulse signal $S_p$ is at high level, that is, when pulse signal $S_p$ is positive, transistor M1 is OFF, while transistor M2 is ON. Also, when pulse signal $S_p$ is at low level, that is, when pulse signal $S_p$ is negative, transistor M1 is ON, while transistor M2 is OFF. Consequently, during the period when pulse signal $S_p$ is negative, input power source voltage $V_{in}$ is applied to coil $L_e$ of output filter unit 10. During the period when pulse signal $S_p$ is positive, a current is fed to the load side by means of coil $L_e$ of filter unit 10.

Consequently, as explained above, when voltage $V_{out}$ sent from output filter unit 10 falls due to variation in the load or the like, the pulse width on the positive half of modulation pulse signal $S_p$ output from PWM modulation unit 30 becomes smaller, and the pulse width on the negative half becomes larger. Consequently, in switching unit 40, the ON time of transistor M1 is controlled to be longer than the ON time of transistor M2 during each period of pulse signal $S_p$. As a result, control is performed so that the proportion of time when input power source voltage $V_{in}$ is applied to output filter unit 10 becomes larger, and output voltage $V_{out}$ becomes higher.

On the other hand, when output voltage $V_{out}$ rises, its divided voltage $V_{o1}$ also rises, and the voltage level of control voltage $V_c$ output from feedback control unit 20 falls. As a result, in PWM modulation unit 30, modulation is performed so that the pulse width on the positive half of pulse signal $S_p$ becomes larger, and the pulse width on the negative half becomes smaller. Consequently, in switching unit 40, control is performed so that the ON time of transistor M1 is shorter than the ON time of transistor M2. Consequently, control is performed so that the proportion of time when input power source voltage $V_{in}$ is applied to output filter unit 10 becomes smaller, and output voltage $V_{out}$ becomes lower.

By means of said feedback control, output voltage $V_{out}$ is controlled to a constant level set in correspondence with reference voltage $V_{ref}$ and the dividing ratio of resistance elements R2 and R3. Consequently, it is possible to send stabilized voltage $V_{out}$ to the load side.

However, in the aforementioned conventional DC-DC converter, in order to ensure stability of the control system, it is necessary to restore the phase by means of the equivalent series resistance ($R_{est}$) of output capacitor $C_{out}$. Consequently, it is hard to stabilize the output by means of a ceramic capacitor or other capacitor with a small equivalent series resistance. Also, there is no load regulation in the circuit constitution. Consequently, it is hard to improve the transient load regulation characteristics.

FIG. 9 is a circuit diagram illustrating an example of the DC-DC converter proposed for solving the aforementioned problems. As shown in the figure, in this DC-DC converter, resistance element $R_c$ is connected between coil $L_e$ of output filter unit 10a and the output terminal of voltage $V_{out}$. The various structural portions other than output filter unit 10a are the same as those of the DC-DC converter shown in FIG. 8.

By connecting series resistance element $R_c$ to the output side of voltage $V_{out}$ in the DC-DC converter of this example, this resistance element $R_c$ works in the same way as the equivalent series resistance of output capacitor $C_{out}$, and restoration of the phase becomes larger. Consequently, it is possible to realize a more stable control system. Also, because resistance element $R_c$ is connected in series to the output side, static load regulation is performed, and the characteristics of the overall load regulation, including during transitions, are improved.

However, in the aforementioned DC-DC converter, a stable low resistance value is required for resistance element $R_c$ connected to the output side. Consequently, an expensive resistance element is needed, leading to rise in cost. Also, a loss in output power takes place due to resistance element $R_c$, and the efficiency of the DC-DC converter decreases. This is undesirable.

SUMMARY OF THE INVENTION

The purpose of this invention is to solve the aforementioned problems of the conventional methods by providing a type of DC-DC converter characterized by the fact that it does not require a series resistance element on the output side, and it can improve the output characteristics and prevent a decrease in efficiency by means of the parasitic resistance of a coil.

In order to realize the aforementioned purpose, this invention provides a type of DC-DC converter having the following circuits: a switching circuit having a first switching element that is connected between a voltage input terminal and an output node and that becomes conductive in correspondence with an input pulse signal; a filter circuit having an inductance element, which has a parasitic resistance component, connected between said output node and voltage output terminal, and a first capacitance element, which has a parasitic resistance component, connected between said voltage output terminal and a reference voltage terminal; a feedback controller that generates a control voltage in correspondence with the voltage output from said output node; and a pulse width modulator that generates said pulse signal, which controls the pulse width in correspondence with said control voltage, and sends it to said switching circuit.

Also, according to this invention it is preferred that said switching circuit have a second switching element or rectifying element, that is connected between said output node and said reference voltage terminal, and that becomes conductive when said first switching element becomes non-conductive.

Also, according to this invention, it is preferred that said feedback control circuit have a first resistance element and a second resistance element connected between said output node and said reference voltage terminal, a second capacitance element connected between said voltage output terminal and the midpoint of the connection between said first and second resistance elements, and a differential amplifier that takes the voltage at the midpoint of the connection between said first and second resistance elements and said reference voltage as inputs, and outputs said control voltage.

Also, according to this invention, it is preferred that said feedback control circuit have a third resistance element connected in parallel with said second capacitance element.

Also, according to this invention, it is preferred that said feedback control circuit have a third capacitance element connected between said midpoint of the connection between said first and second resistance elements and the output terminal of said differential amplifier.

Also, according to this invention, it is preferred that said feedback control circuit have a third capacitance element and a third resistance element connected in series between the midpoint of the connection between said first and second resistance elements and the output terminal of said differential amplifier, and a fourth capacitance element connected in parallel with said third capacitance element.

Also, according to this invention, it is preferred that said feedback control circuit have a first resistance element and a second resistance element connected in series between said output node and said voltage output terminal, a transconductance amplifier that takes the voltage at the midpoint of the connection between said first resistance element and said second capacitance element and said reference voltage as inputs and outputs a current signal, and a third capacitance element that converts the current signal output from said transconductance amplifier to a voltage signal.

Also, according to this invention, it is preferred that said pulse width modulator have a comparator that compares said control voltage with a sawtooth signal to generate said pulse signal.

REFERENCE NUMERALS AND SYMBOLS AS SHOWN IN THE DRAWINGS

In the figures, 10 represents an output filter unit, 20, 20a a feedback control unit, 30 a PWM modulation unit, 40 a switching unit, 100, 100a, 100b, 100c a feedback control unit

DESCRIPTION OF THE EMBODIMENTS

Embodiment 1

Figure 1:
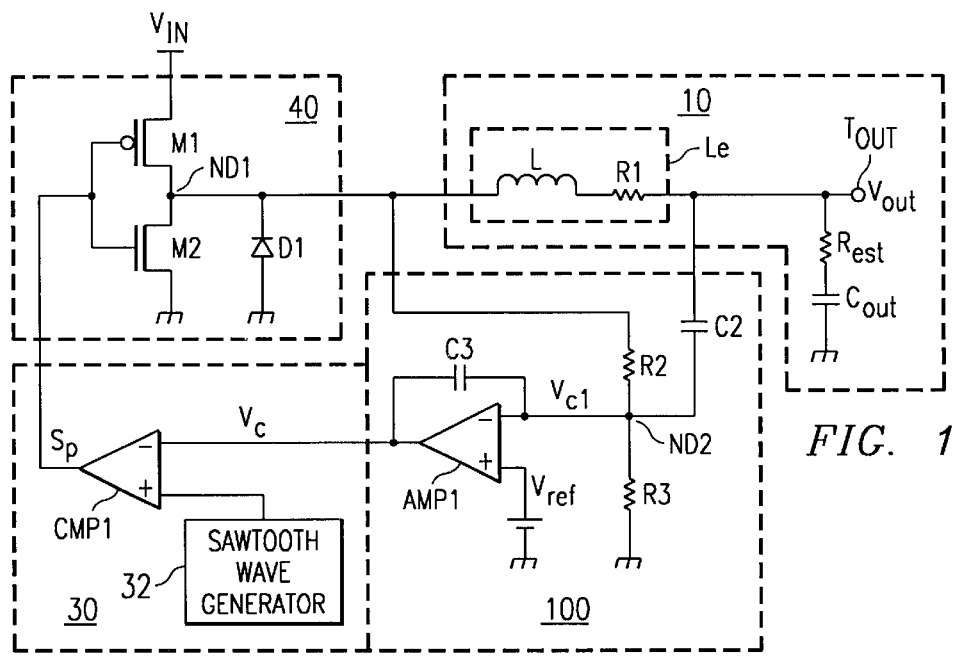
FIG. 1 is a circuit diagram illustrating Embodiment 1 of the DC-DC converter in this invention.

FIG. 1 is a circuit diagram illustrating Embodiment 1 of the DC-DC converter of this invention.

As shown in the figure, the DC-DC converter in this embodiment is composed of output filter unit 10, pulse width modulation unit (PWM modulation unit) 30, switching unit 40, and feedback control unit 100.

In the following, we will examine the structure and operation of the various parts of this embodiment.

Output filter unit 10 is composed of coil $L_e$ and output capacitor $C_{out}$.

Coil $L_e$ is connected between output node ND1 of switching unit 40 and output terminal $T_{out}$. Output capacitor $C_{out}$ is connected between output terminal $T_{out}$ and ground potential GND.

Coil $L_e$ is equivalently composed of inductance L and parasitic resistance R1 connected in series. On the other hand, output capacitor $C_{out}$ has equivalent series resistance $R_{est}$.

For the DC-DC converter of this embodiment, the output characteristics of voltage $V_{out}$ are improved by means of parasitic resistance R1 of coil $L_e$ without adding a resistance element to the output terminal.

Feedback control unit 100 is composed of differential amplifier AMP1, resistance elements R2, R3, and capacitors C2, C3.

Resistance elements R2 and R3 are connected in series between output node ND1 of switching portion 40 and ground potential GND. That is, the voltage of output node ND1 of switching unit 40 is divided by means of resistance elements R2 and R3 to generate divided voltage $V_{o1}$.

Divided voltage $V_{o1}$ is applied to the inverting input terminal of differential amplifier AMP1. Also, prescribed reference voltage $V_{ref}$ is applied to the non-inverting input terminal of differential amplifier AMP1. Capacitor C3 is connected between the inverting input terminal and the output terminal of differential amplifier AMP1. Also, as shown in FIG. 1, capacitor C2 is connected between node ND2, which is the connecting point between resistance elements R2 and R3, and output terminal $T_{out}$.

Feedback control unit 100 divides the voltage of output node ND1 of switching unit 40, integrates the divided voltage, compares the integrated voltage with $V_{ref}$, and outputs control voltage $V_c$ in correspondence with the result of said comparison.

In correspondence with control voltage $V_c$ from feedback control unit 20 and the sawtooth wave generated by sawtooth generator 32, PWM modulation unit 30 generates pulse signal $S_p$ with modulated pulse width, and sends it to switching unit 40.

As shown in the figure, PWM modulation unit 30 is composed of comparator CMP1 and sawtooth generator 32. Control voltage $V_c$ is applied to the inverting input terminal of comparator CMP1, and the sawtooth signal generated by sawtooth generator 32 is applied to the non-inverting input terminal.

Pulse signal $S_p$ with its pulse width modulated in correspondence with control voltage $V_c$ is output from the output terminal of comparator CMP1. In this case, assuming the offset voltage of the sawtooth wave generated by sawtooth generator 32 to be constant, when the level of control voltage $V_c$ becomes higher, the pulse width on the positive half of output pulse signal $S_p$ becomes smaller and the pulse width on the negative half becomes larger. On the other hand, when the level of control voltage $V_c$ becomes lower, the pulse width on the positive half of pulse signal $S_p$ becomes larger and the pulse width on the negative half becomes smaller.

In the following, we will examine the feedback control operation of the DC-DC converter in this embodiment.

In switching unit 40, transistors M1 and M2 are controlled to be ON/OFF in correspondence with pulse signal $S_p$ fed from PWM modulation unit 30. For example, when pulse signal $S_p$ is kept at high level, transistor M1 is turned OFF, and transistor M2 is turned ON. On the other hand, when pulse signal $S_p$ is kept at low level, transistor M1 is turned ON, and transistor M2 is turned OFF. During the ON period of transistor M1, current $I_c$ is fed from input power source voltage $V_{in}$ to output filter unit 10. When transistor M1 is OFF and transistor M2 is ON, a current is fed to the load side by means of coil $L_e$ of output filter unit 10.

The level of control voltage $V_c$ is controlled in correspondence with the level of output voltage $V_{out}$ by means of feedback control unit 100. In addition, the ratio of the positive-side pulse to the negative-side pulse of output pulse signal $S_p$ is controlled in correspondence with control voltage $V_c$ by means of PWM modulation unit 30. That is, the duty ratio of pulse signal $S_p$ is controlled.

The reason for variation in load, etc. is the up/down variation of the level of output voltage $V_{out}$ with respect to the reference value.

For example, when the level of output voltage $V_{out}$ fed to the load falls due to variation in load or the like, divided voltage $V_{o1}$ generated by resistance elements R2 and R3 also falls, and control voltage $V_c$ output from feedback control unit 20 rises. As a result, the pulse width on the positive half of pulse signal $S_p$ becomes smaller, and the pulse width on the negative half becomes larger in PWM modulation unit 30.

As a result, in switching unit 40, during one period of pulse signal $S_p$, control is performed so that the ON time of transistor M1 is longer than the ON time of transistor M2. Consequently, control is performed so that the proportion of time when input power source voltage $V_{in}$ is applied to output filter unit 10 becomes longer, and output voltage $V_{out}$ rises.

On the other hand, when output voltage $V_{out}$ rises due to variation in the load or the like, divided voltage $V_{o1}$ also rises, and the voltage level of control voltage $V_c$ output from feedback control unit 20 falls. As a result, modulation is performed in PWM modulation unit 30 such that the pulse width on the positive half of pulse signal $S_p$ becomes larger, and the pulse width on the negative half becomes smaller. Consequently, in switching unit 40, control is performed so that the time when transistor M1 is ON is shorter than the time when transistor M2 is ON. Consequently, control is performed so that the proportion of time when input power source voltage $V_{in}$ is applied to output filter unit 10 becomes shorter, and output voltage $V_{out}$ falls.

As shown in FIG. 1, in the DC-DC converter of this embodiment, resistance element R2 draws voltage from node ND1 in order to generate divided voltage $V_{o1}$. That is, the voltage obtained from feedback is not the unchanged output voltage $V_{out}$. Instead, it is the voltage on the input side of coil $L_e$. As shown in the figure, there is parasitic resistance R1 of coil $L_e$ between said access point and output terminal $T_{out}$. That is, in this embodiment, the output voltage characteristics are improved by means of parasitic resistance R1 of coil $L_e$. As a result, it is possible to improve the conversion efficiency without the need to connect a resistance element with a small resistance value between coil $L_e$ and output terminal $T_{out}$.

Also, the transmission characteristics of the feedback control system may vary when the site where the feedback voltage is obtained is changed. Consequently, in the DC-DC converter of this embodiment, capacitor C2 is arranged between the connecting point between voltage dividing resistance elements R2 and R3, that is, node ND2 as the output point of divided voltage $V_{o1}$, and output terminal $T_{out}$.

In the following, the transfer function of the control system of the DC-DC converter in this embodiment will be derived, and it will be explained how the transmission characteristics are the same as those of the conventional DC-DC converter.

In this case, for the DC-DC converter of this embodiment first of all we will determine the transfer function from node ND1 to the output terminal of feedback control unit 100, that is to say, the output terminal of differential amplifier AMP1.

Figure 2A:
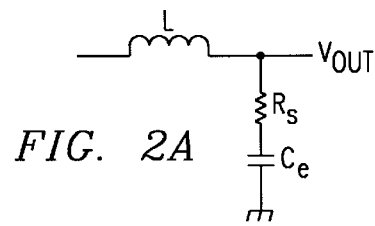
FIG. 2 is a circuit diagram illustrating the equivalent circuit of the output filter unit.

FIG. 2 is a diagram illustrating the equivalent circuit of output filter unit 10. Transfer function $H_1(s)$ of output filter unit 10 according to the equivalent circuit shown in FIG. 2(a) is shown as the following equation:

$$H_1(s) = (Re + 1/sCe)/(sL + Re + 1/sCe) \quad (1)$$

$$= (1 + sReCe)/(1 + sReCe + s^2LCe)$$

In Equation (1), L, Ce and Re represent the inductance of coil $L_e$, the capacitance of output capacitor $C_{out}$, and the equivalent series resistance of output capacitor $C_{out}$, respectively.

Figure 2B:
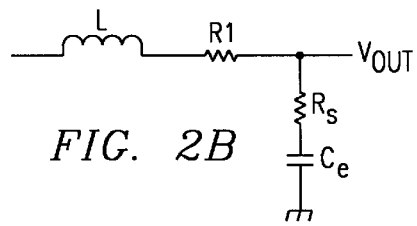

On the other hand, when coil $L_e$ is represented equivalently as a series circuit of inductance L and its parasitic resistance R1, as shown in FIG. 2(b), (Re+R1) is substituted for Re in the denominator of transfer function $H_1(s)$ for said output filter unit 10, and it becomes $H_1'(s)$ shown in the following equation.

$$H_1'(s) = (Re + 1/sCe)/(sL + Re + R1 + 1/sCe) \quad (2)$$

$$= (1 + sReCe)/(1 + s(Re + R1)Ce + s^2LCe)$$

As shown in FIG. 1, assuming differential amplifier AMP1 to be an ideal operational amplifier, transfer function $H_{10}(s)$ from node ND1 to the output terminal of feedback control unit 100, that is, to the output terminal of differential amplifier AMP1, is represented by the following equation:

$$H_{10}(s) = -(1/sC3)/R2 - H_1'(s)((1/sC3)/(1/sC2)) \quad (3)$$

$$= -[1/sR2C3 + sC2/sC3(1 + sReCe)/$$

$$(1 + s(Re + R1)Ce + s^2LCe)]$$

$$= -[1 + s(Re + R1)Ce + s^2LCe + sR2C2(1 + sReCe)]/$$

$$[sR2C3(1 + s(Re + R1)Ce + s^2LCe)]$$

$$= -[1 + s(ReCe + R1Ce + R2C2) + s^2Ce(L + C2R2Re)]/$$

$$[sR2C3(1 + s(Re + R1)Ce + s^2LCe)]$$

$$= -[1 + s(ReCe + R1Ce + R2C2) + s^2R2CeC2(L/C2R2 + Re)]/$$

$$[sR2C3(1 + s(Re + R1)Ce + s^2LCe)]$$

Figure 9:
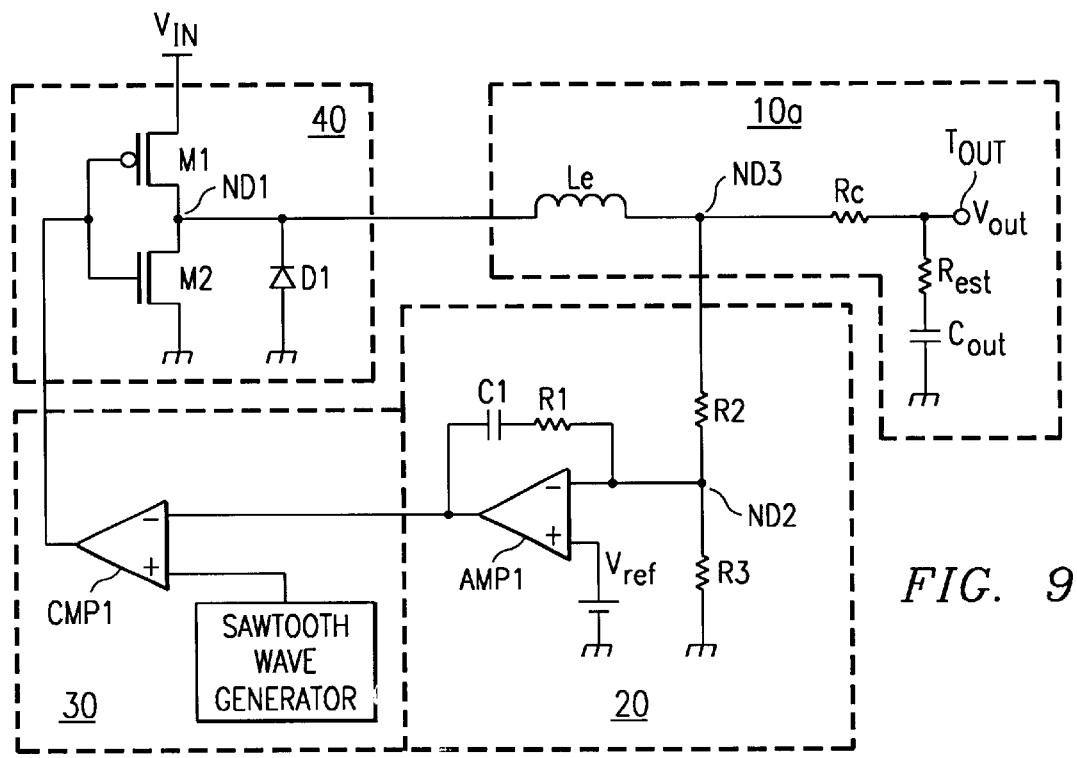
FIG. 9 is a circuit diagram illustrating another example of the constitution of a conventional DC-DC converter.

On the other hand, in the DC-DC converter shown in FIG. 9 that illustrates the prior art, transfer function $H_{20}(s)$ from node ND1 to the output terminal of differential amplifier AMP1 is represented by the following equation:

$$H_{20}(s) = -[(R1 + 1/sC1)/R2]H_1''(s) \quad (4)$$

$$= -[(1 + sR1C1)/sR2C1]H_1''(s)$$

In Equation (4), $H_1''$ represents the transfer function from node ND1 to node ND3 in output filter unit 10a, and it is represented by the following equation:

$$H_1''(s) = (Rc + Re + 1/sCe)/(sL + Rc + Re + 1/sCe) \quad (5)$$

$$= [1 + s(Rc + Re)Ce]/[1 + s(Rc + Re)Ce + s^2LCe]$$

By substituting Equation (5) into Equation (4), one gets the following function as transfer function $H_{20}(s)$.

$$H_{20}(s) = -[(1 + sR1C1)/sR2C1][1 + s(Rc + Re)Ce]/ \quad (6)$$

$$[1 + (Rc + Re)sCe + s^2LCe]$$

$$= [1 + s(R1C1 + RcCe + ReCe) + s^2R1(Rc + Re)CeC1]/$$

$$sR2C1[1 + (Rc + Re)sCe + s^2LCe]$$

When said Equation (3) and Equation (6) are compared with each other, one finds that Equation (3) and Equation (6) are equal to each other when the following conditions are met.

$$R2C2 = R1C1 \quad (7)$$

$$L/C2R2 = Rc \quad (8)$$

$$R2C3 = R2C1 \quad (9)$$

$$R1 = Rc \quad (10)$$

From Equation (7), one gets C2=R1C1/R2. According to Equation (8), one gets C2=L/R2Rc. Also, from Equation (9), one gets C3=C1.

As explained above, in the DC-DC converter of this embodiment, it is possible by means of the parasitic resistance R1 of coil $L_e$ to avoid using a low-resistance element to improve the stability of output on the output side of output filter unit 10. In order to make use of parasitic resistance R1 of the coil, as shown in FIG. 1, in feedback control unit 100 that feeds back the output voltage, the output voltage is obtained from node ND1 of switching unit 40. Also, assuming the inductance of coil $L_e$ to be L, capacitor C2 with its capacitance equal to L/RcR2 is arranged between output terminal $T_{out}$ and node ND2 as the output node of divided voltage $V_{o1}$. Also, capacitor C3 with its capacitance equal to C1 is arranged between the inverting input terminal and the output terminal of differential amplifier AMP1. By means of said capacitor C3, the high-frequency feedback gain of feedback control unit 100 is set.

In the conventional DC-DC converter shown in FIG. 9, the time constant of C1R1 can be set at will. However, in the DC-DC converter of this embodiment, it is necessary to meet the relationship of L/R1=R2C2 for inductance L and parasitic resistance R1 of coil $L_e$ with respect to resistance element R2 and capacitor C2.

Also, in order to ensure safety of the control system, it is necessary to meet the following relationship.

$$L/R1 >> (LC_e)^{1/2} \qquad (11)$$

According to relationship 11, parasitic resistance R1 of coil $L_e$ has to meet the following relationship.

$$R1 << (L/C_e)^{1/2} \qquad (12)$$

Because the condition of relationship 12 can be met by using conventionally available components, there are few restrictions on the circuit components of the DC-DC converter.

Figure 3:
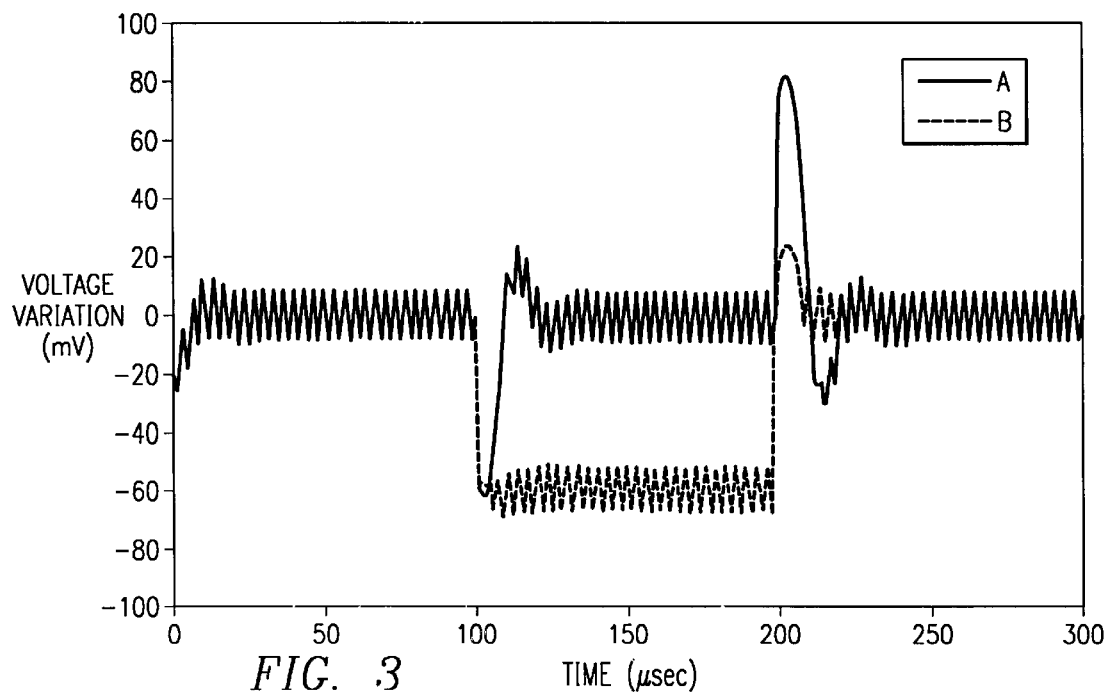
FIG. 3 is a waveform diagram illustrating the transient response characteristics of the output voltage of the DC-DC converter.

FIG. 3 is a waveform diagram illustrating the transient response characteristics of output voltage $V_{out}$ of the DC-DC converter in this embodiment.

In FIG. 3, the abscissa represents time t, and the ordinate represents voltage $V_{out}$. In the waveform example shown in the figure, when time t=100 μs, a change in the waveform of output voltage $V_{out}$ takes place due to a change in the load and an increase in the output current.

In this case, for example, the load current rises due to a variation in load or the like at time t=100 μs, and the load current returns to the original level at time t=200 μs. FIG. 3 is a diagram illustrating the output response characteristics, with respect to variation in the load current, of the DC-DC converter in this embodiment and the conventional DC-DC converter.

Figure 8:
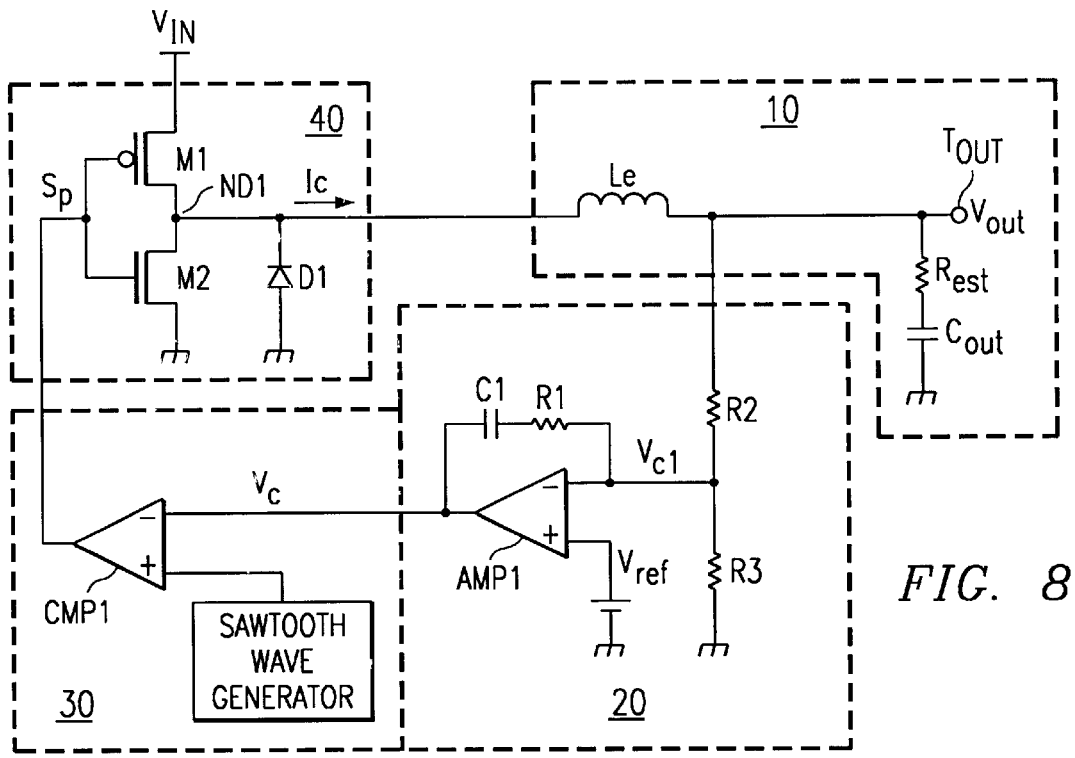
FIG. 8 is a circuit diagram illustrating an example of the constitution of a conventional DC-DC converter.

In FIG. 3, A represents the waveform of output voltage $V_{out}$ of a conventional DC-DC converter, such as the DC-DC converter shown in FIG. 8, and B represents the waveform of output voltage $V_{out}$ of the DC-DC converter in this embodiment. As shown in the figure, for the conventional DC-DC converter, output voltage $V_{out}$ is kept at almost a constant level with respect to variation in the load. However, considerable ringing takes place at the point of variation of the load.

On the other hand, for the DC-DC converter of this embodiment, although there is a little change in output voltage $V_{out}$ in correspondence with variation in the load, no significant ringing takes place at the point of variation in the load, and the stability of output is improved. Also, the conventional DC-DC converter shown in FIG. 9 has almost the same response characteristics as those of the DC-DC converter in this embodiment. As explained above, the DC-DC converter of this embodiment and that shown in FIG. 9 have the same transfer characteristics in the feedback control unit. In the DC-DC converter shown in FIG. 9, external resistance element $R_c$ is connected to the voltage $V_{out}$ output side to improve the output characteristics. On the other hand, for the DC-DC converter in this embodiment, the parasitic resistance of coil $L_e$ is used to realize the static load regulation output characteristics. Consequently, while the conversion efficiency is maintained, stability of the feed voltage is increased, and the output characteristics are improved.

As explained above, for the DC-DC converter in this embodiment, it is possible to improve the characteristics of output voltage $V_{out}$ by using the parasitic resistance of the coil. As a result, it is possible to decrease the cost of the circuit without connecting an expensive resistance element to the output side, and it is also possible to conserve the electrical power consumed in the resistance element and to increase the conversion efficiency. This is an advantage.

Embodiment 2

Figure 4:
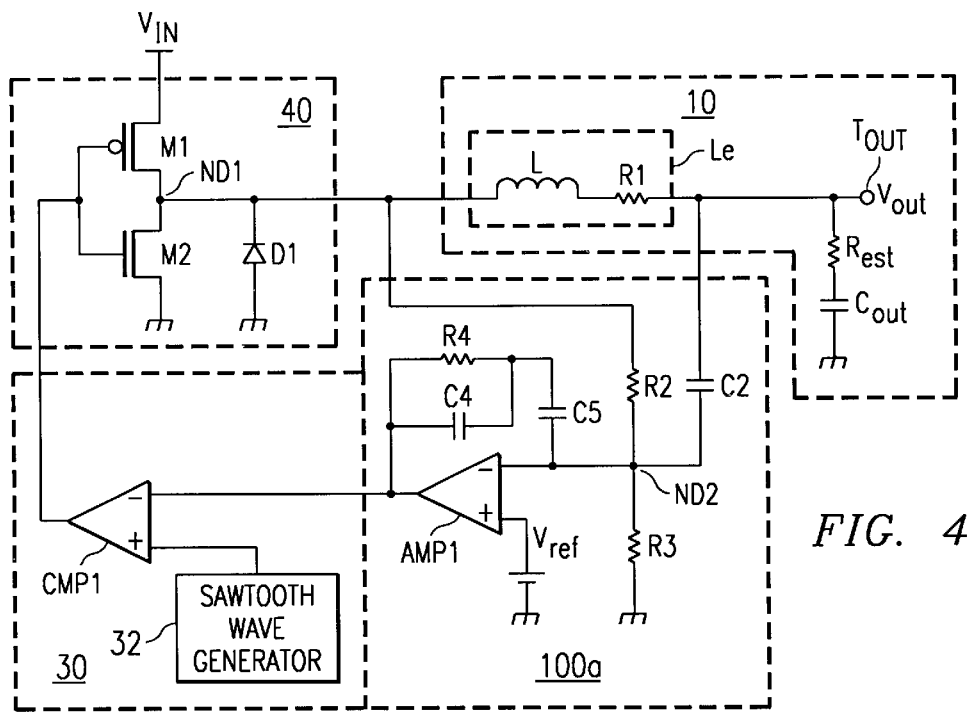
FIG. 4 is a circuit diagram illustrating Embodiment 2 of the DC-DC converter in this invention.

FIG. 4 is a circuit diagram illustrating Embodiment 2 of the DC-DC converter in this invention.

As shown in the figure, the DC-DC converter of this embodiment is composed of output filter unit 10, pulse width modulation unit (PWM modulation unit) 30, switching unit 40, and feedback control unit 100a. Also, compared with the DC-DC converter of said Embodiment 1 of this invention, the converter in this embodiment has nearly the same structure and function except for feedback control unit 100a. Consequently, in the following this embodiment will be explained mainly with respect to feedback control unit 100a.

As shown in the figure, feedback control unit 100a is composed of differential amplifier AMP1, voltage-dividing resistance elements R2, R3, capacitors C2, C4, and resistance element R4.

Resistance elements R2 and R3 are connected in series between output node ND1 of switching unit 40 and ground potential GND. That is, the voltage of output node ND1 of switching unit 40 is divided, and divided voltage $V_{o1}$ is generated by means of resistance elements R2 and R3.

Divided voltage $V_{o1}$ is applied to the inverting input terminal of differential amplifier AMP1. Also, prescribed reference voltage $V_{ref}$ is applied to the non-inverting input terminal of differential amplifier AMP1. Capacitor C5 is connected in series with capacitor C4 and resistance element R5, which are parallel connected, between the inverting input terminal of differential amplifier AMP1 and the output terminal. Also, as shown in FIG. 4, capacitor C2 is connected between node ND2, which is the point of connection between resistance elements R2 and R3, and output terminal $T_{out}$.

Figure 5:
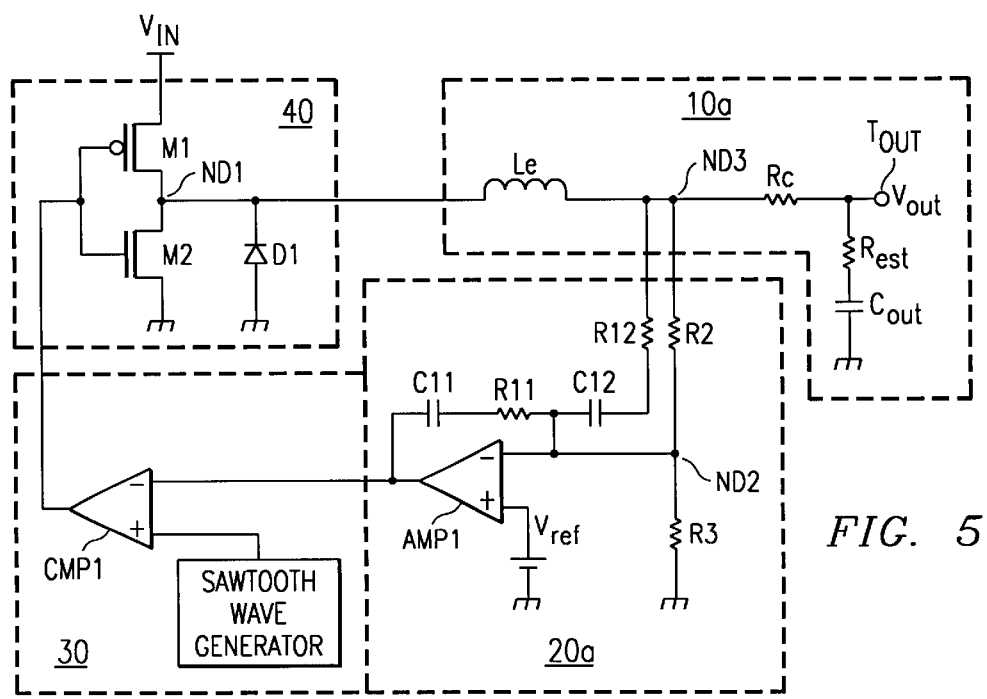
FIG. 5 is a circuit diagram illustrating an example of the constitution of a conventional DC-DC converter.

The DC-DC converter of this embodiment is an improvement over the conventional DC-DC converter shown in FIG. 5. As shown in FIG. 5, in this DC-DC converter, resistance element $R_c$ is connected to the output side. That is, resistance element $R_c$ is connected between the output terminal of coil $L_e$ and output terminal $T_{out}$ for voltage $V_{out}$. Resistance element $R_c$ has a small resistance value, and performs static load regulation for the output characteristics of the DC-DC converter. As a result, stability of the output can be improved.

For the DC-DC converter shown in FIG. 5, it is possible to realize phase restoration of the feedback control system, and to improve the stability of the control system by connecting resistance element $R_c$ to output terminal $T_{out}$. In addition, when phase restoration due to resistance element $R_c$ is insufficient, resistance element R12 and capacitor C12 to feedback control unit 20a are added as a circuit that further restores the phase and provides compensation.

Unlike the conventional DC-DC converter shown in FIG. 5, a feedback voltage is obtained from output node ND1 of switching unit 40 in the DC-DC converter of this embodiment. That is, voltage-dividing resistance elements R2 and R3 are connected in series between node ND1 and ground potential GND. Consequently, parasitic resistance R1 of coil $L_e$ performs static load regulation, and this can improve the stability of output voltage $V_{out}$.

Also, in this embodiment, in order to have the transfer characteristics of feedback control unit 100a in agreement with the transfer characteristics of feedback control unit 20a of the DC-DC converter shown in FIG. 5, resistance element R4 and capacitors C4 and C5 are arranged between the inverting input terminal and output terminal of differential amplifier AMP1, and, in addition, capacitor C2 is connected between node ND2 and output terminal $T_{out}$.

For the DC-DC converter in this embodiment with the aforementioned constitution, it is possible by providing circuit elements that satisfy the following equations to achieve the same transfer function as that of feedback control unit 20a of the aforementioned DC-DC converter shown in FIG. 5.

$$R4C4=R12C12 \quad (13)$$

$$R4C5=R2C12 \quad (14)$$

In the DC-DC converter of this embodiment, by determining the values of resistance element R4 and capacitors C4 and C5 according to Equations (13) and (14), it is possible to realize almost the same feedback control characteristics as those of the conventional DC-DC converter shown in FIG. 5. In addition, because the output characteristics are improved by means of the parasitic resistance of coil $L_e$ for the DC-DC converter of this embodiment, there is no need to connect resistance element $R_c$ to the output side, and it is possible to realize static load regulation without a decrease in conversion efficiency.

Embodiment 3

Figure 6:
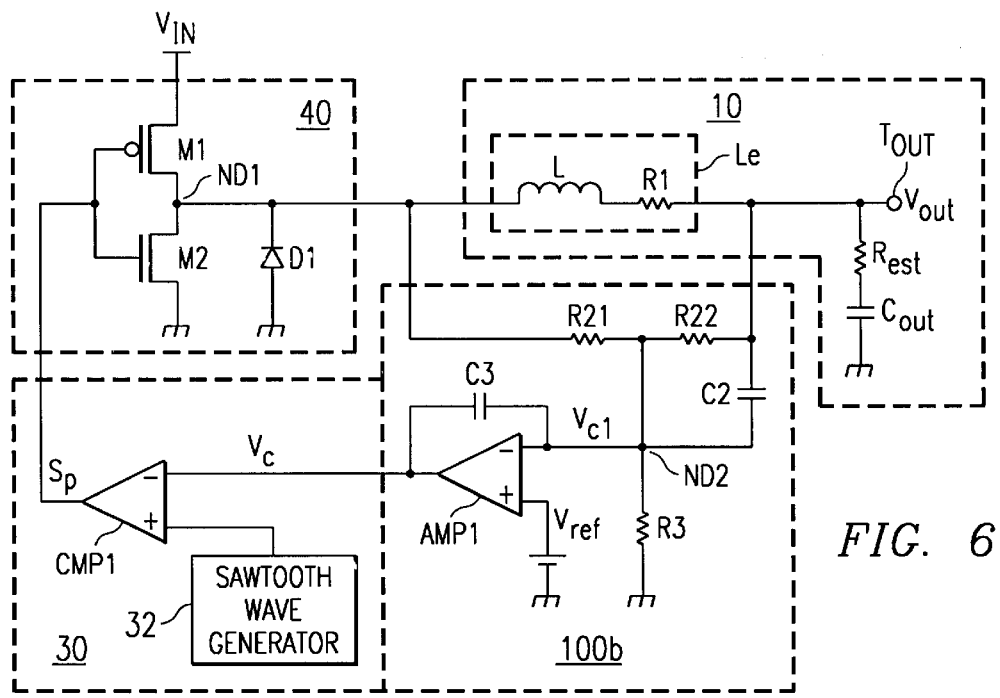
FIG. 6 is a circuit diagram illustrating Embodiment 3 of the DC-DC converter in this invention.

FIG. 6 is a circuit diagram illustrating Embodiment 3 of the DC-DC converter in this invention.

As shown in the figure, the DC-DC converter in this embodiment is composed of output filter 10, pulse width modulation unit (PWM modulation unit) 30, switching unit 40 and feedback control unit 100b. This embodiment has almost the same structure and function as those of the DC-DC converter in Embodiment 1 of this invention, except for feedback control unit 100b. Consequently, this embodiment will be explained in the following mainly with respect to feedback control unit 100b.

As shown in FIG. 6, in the DC-DC converter of this embodiment, resistance elements R21 and R3 are provided as voltage-dividing resistance elements. These resistance elements are connected in series between output node ND1 of switching unit 40 and ground potential GND. Also, resistance element R22 and capacitor C2 are connected in parallel with each other between node ND2, which is the connecting point between resistance elements R21 and R3, and output terminal $T_{out}$.

In feedback control unit 100b of the DC-DC converter of this embodiment, output voltage $V_{out}$ is divided by means of a voltage-dividing circuit composed of resistance elements R21, R22 and resistance element R3. Divided voltage $V_{o1}$ generated in this way is input to the inverting input terminal of differential amplifier AMP1. Reference voltage $V_{ref}$ is input to the non-inverting input terminal of differential amplifier AMP1.

By means of differential amplifier AMP1, divided voltage $V_{o1}$ and reference voltage $V_{ref}$ are compared with each other, and control voltage $V_c$ is generated in correspondence with the comparison result and is fed to PWM modulation unit 30. Pulse signal $S_p$ with controlled duty ratio is generated in correspondence with control voltage $V_c$, and this is fed to switching unit 40.

Resistance elements R21 and R22 are provided in feedback control unit 100b so that the voltage generated in parasitic resistance R1 of coil $L_e$ is divided by resistance elements R21 and R22, and the divided voltage is output.

For the DC-DC converter in this embodiment, static load regulation is achieved for the output characteristics by using the parasitic resistance of the coil. Consequently, it is possible to improve the output characteristics. Also, there is no need to connect the external resistance to the output side, and it is possible to improve the stability of the output voltage while the conversion efficiency is maintained.

Embodiment 4

Figure 7:
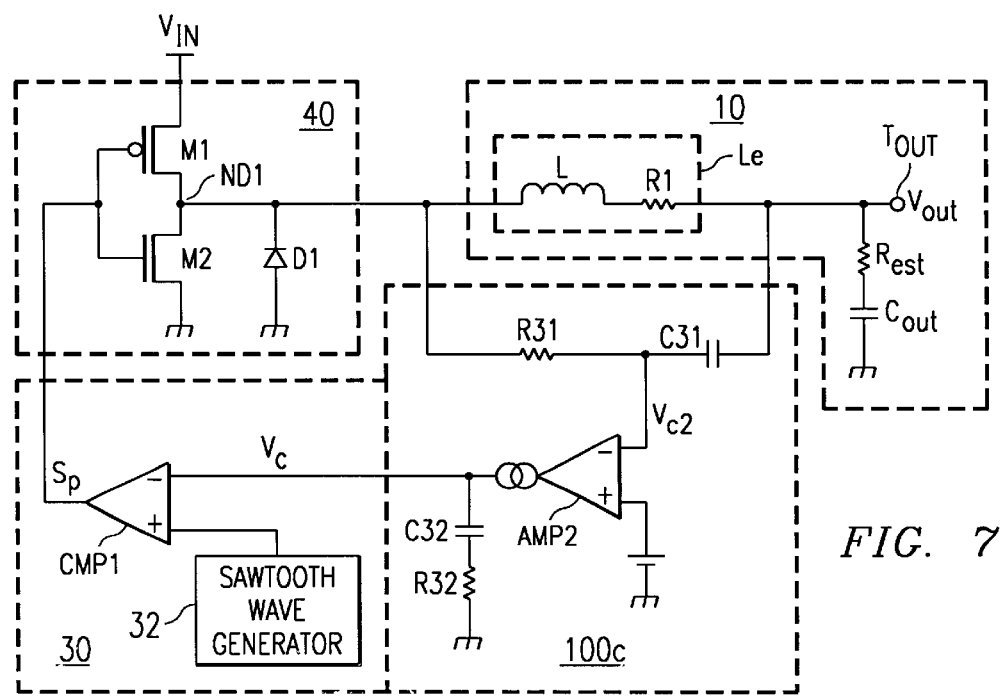
FIG. 7 is a circuit diagram illustrating Embodiment 4 of the DC-DC converter in this invention.

FIG. 7 is a circuit diagram illustrating Embodiment 4 of the DC-DC converter in this invention.

As shown in the figure, the DC-DC converter in this embodiment is composed of output filter unit 10, pulse width modulation unit (PWM modulation unit) 30, switching unit 40, and feedback control unit 100c. Also, this embodiment has almost the same structure and function as those of the DC-DC converter in Embodiment 1 of this invention, except for feedback control unit 100c. Consequently, this embodiment will be explained in the following mainly with respect to feedback control unit 100c.

As shown in the figure, feedback control unit 100c is composed of differential amplifier (transconductance amplifier) AMP2, voltage-dividing resistance elements R31, R32, and capacitors C31, C32.

In the DC-DC converter of this embodiment, differential amplifier AMP2 of feedback control unit 100c comprises a transconductance amplifier, and it outputs a current in correspondence with the input differential voltage.

As shown in FIG. 7, resistance element R31 and capacitor C31 are connected in parallel with coil $L_e$. The connecting point between resistance element R31 and capacitor C31 is connected to the inverting input terminal of transconductance amplifier AMP2. Reference voltage $V_{ref}$ is applied to the non-inverting input terminal of transconductance amplifier AMP2.

Capacitor C32 and resistance element R32 are connected in series between the output terminal of transconductance amplifier AMP2 and ground potential GND.

In feedback control unit 100c with the aforementioned constitution, by means of transconductance amplifier AMP2, a current is output in correspondence with the difference between voltage $V_{o2}$ at the connecting point between resistance element R31 and capacitor C31 and reference voltage $V_{ref}$. This current charges capacitor C32 to generate control voltage $V_c$. That is, voltage $V_c$ at the output terminal of transconductance amplifier AMP2 is determined in correspondence with the difference between input voltage $V_{o2}$ and reference voltage $V_{ref}$.

Voltage $V_c$ output from feedback control unit 100c is sent as a control voltage to PWM modulation unit 30. In PWM modulation unit 30, the pulse width of output pulse signal $S_p$ is controlled in correspondence with control voltage $V_c$. That is, the duty ratio of pulse signal $S_p$ is controlled in correspondence with control voltage $V_c$. Pulse signal $S_p$ is sent to switching unit 40. Then, in switching unit 40, transistors M1 and M2 are controlled to be ON/OFF alternately in correspondence with the pulse width of pulse signal $S_p$, and output voltage $V_{out}$ of output filter unit 10 is controlled to be almost constant.

In feedback control unit 100c, resistance element R31 and capacitor C31 form a voltage detection circuit for detecting the voltage of coil $L_e$. As shown in the figure, coil $L_e$ can be represented equivalently as a series circuit of inductance L and parasitic resistance R1.

In the detection circuit composed of resistance element R31 and capacitor C31, voltage $V_{o2}$ at the connecting point between resistance element R31 and capacitor C31 is proportional to the current of coil $L_e$ when the following condition is met:

$$L1/R1 = R31C31 \quad (15)$$

That is, feedback control is carried out in feedback control unit 100c in correspondence with the output current flowing in coil $L_e$ of output filter unit 10. As the current of coil $L_e$ rises, voltage $V_{o2}$ rises, and, in correspondence with this rise in voltage, the output current of transconductance amplifier AMP2 falls, and the level of control voltage $V_c$ falls. In PWM modulation unit 30, as the level of control voltage $V_c$ falls, the width on the positive half of pulse signal $S_p$ becomes larger, and the width on the negative half becomes smaller. As a result, in switching unit 40 the ON time of transistor M1 becomes shorter and the ON time of transistor M2 becomes longer. Consequently, the time during which a driving current is fed to output filter unit 10 becomes shorter.

On the other hand, when the current flowing in coil $L_e$ of output filter unit 10 decreases, voltage $V_{o2}$ falls, and, as a result, the output current of transconductance amplifier AMP2 becomes higher, and the level of control voltage $V_c$ rises. In PWM modulation unit 30, as the level of control voltage $V_c$ becomes higher, the width of pulse signal $S_p$ on the positive half becomes smaller, and the width on the negative half becomes larger. As a result, in switching unit 40 the ON time of transistor M1 becomes longer and ON time of transistor M2 becomes shorter. Consequently, the time during which a driving current is fed to output filter unit 10 becomes longer.

As explained above, the current flowing in coil $L_e$ of output filter unit 10 is detected by means of feedback control unit 100c, control voltage $V_c$ is generated and in correspondence with the result of detection. Consequently, feedback control is performed so that the output current of coil $L_e$ becomes continuously constant, and it is possible to feed a stable output current and output voltage $V_{out}$ to the load.

As explained above, it is possible to improve stability of the feedback control system by means of the parasitic resistance of the coil for the DC-DC converter of this invention. Also, static load regulation is performed, and characteristics of the output voltage can be improved.

In addition, according to this invention, it is possible by utilizing the parasitic resistance of the coil to not use an expensive external resistor on the output side, while realizing an increase in conversion efficiency, reduction in circuit cost, and conservation of power consumption.

What is claimed is:

1. A DC-DC converter comprising:
   a switching circuit having a first switching element that is connected between a voltage input terminal and an output node and that becomes conductive in correspondence with an input pulse signal;
   a filter circuit having an inductance element, which has a parasitic resistance component, connected between said output node and the voltage output terminal, and a first capacitance element, which has a parasitic resistance component, connected between said voltage output terminal and a reference voltage terminal;
   a feedback controller that generates a control voltage in correspondence with the voltage output from said output node; and a pulse width modulator that generates said pulse signal, which controls the pulse width in correspondence with said control voltage, and sends it to said switching circuit and
   wherein said feedback controller has a first resistance element and a second resistance element connected between said outcut node and said reference voltage terminal, a second capacitance element connected between said voltage output terminal and the midpoint of the connection between said first and second resistance elements, and an amplifier circuit that takes the voltage at the midpoint of the connection between said first and second resistance elements and said reference voltage as inputs, and outputs said control voltage.

2. The DC-DC converter described in claim 1 wherein said switching circuit has a second switching element or rectifying element, which is connected between said output node and said reference voltage terminal and which becomes conductive when said first switching element becomes non-conductive.

3. The DC-DC converter described in claim 2 wherein said amplifier circuit is a differential amplifier.

4. The DC-DC converter described in claim 3 wherein said feedback control circuit has a third resistance element connected in parallel with said second capacitance element.

5. The DC-DC converter described in claim 4 wherein said feedback control circuit has a third capacitance element connected between said midpoint of the connection between said first and second resistance elements and the output terminal of said differential amplifier.

6. The DC-DC converter described in claim 3 wherein said feedback control circuit has a third capacitance element and a third resistance element connected in series between the midpoint of the connection between said first and second resistance elements and the output terminal of said differential amplifier, and a fourth capacitance element connected in parallel with said third capacitance element.

7. The DC-DC converter described in claim 2 wherein said feedback control circuit has a first resistance element and a second resistance element connected in series between said output node and said voltage output terminal, a transconductance amplifier that takes the voltage at the midpoint of the connection between said first resistance element and said second capacitance element and said reference voltage as inputs and outputs a current signal, and a third capacitance element that converts the current signal output from said transconductance amplifier to a voltage signal.

8. The DC-DC converter described in claim 4 wherein said pulse width modulator has a comparator that compares said control voltage with a sawtooth signal and generates said pulse signal.

9. The DC-DC converter described in claim 7 wherein said pulse width modulator has a comparator that compares said control voltage with a sawtooth signal and generates said pulse signal.

10. A DC-DC converter comprising:
    a switching circuit having a first switching element that is connected between a voltage input terminal and an output node and that becomes conductive in correspondence with an input pulse signal;
    a filter circuit having an inductance element, which has a parasitic resistance component, connected between said output node and the voltage output terminal, and a first capacitance element, which has a parasitic resistance component, connected between said voltage output terminal and a reference voltage terminal;

a feedback controller that generates a control voltage in correspondence with the voltage output from said output node; and a pulse width modulator that generates said pulse signal, which controls the pulse width in correspondence with said control voltage, and sends it to said switching circuit, and wherein said feedback control circuit has a first resistance element connected between a voltage source and an amplifier circuit a second capacitance element connected between said voltage output terminal and the midpoint of the connection between said first resistance element and said amplifier circuit, wherein said amplifier circuit takes the voltage at the midpoint of the connection between said first resistance element and said second capacitor and said reference voltage as inputs, and outputs said control voltage.

11. The DC-DC converter described in claim 10 wherein said switching circuit has a second switching element or rectifying element, which is connected between said output node and said reference voltage terminal and which becomes conductive when said first switching element becomes non-conductive.

12. The DC-DC converter described in claim 2 wherein said amplifier circuit is a differential amplifier.

13. The DC-DC converter described in claim 12 wherein said feedback control circuit has a third resistance element connected in parallel with said second capacitance element.

14. The DC-DC converter described in claim 13 wherein said feedback control circuit has a third capacitance element connected between said midpoint of the connection between said first and second resistance elements and the output terminal of said differential amplifier.

15. The DC-DC converter described in claim 12 wherein said feedback control circuit has a third capacitance element and a third resistance element connected in series between the midpoint of the connection between said first and second resistance elements and the output terminal of said differential amplifier, and a fourth capacitance element connected in parallel with said third capacitance element.

16. The DC-DC converter described in claim 11 wherein said feedback control circuit has a first resistance element and a second resistance element connected in series between said output node and said voltage output terminal, a transconductance amplifier that takes the voltage at the midpoint of the connection between said first resistance element and said second capacitance element and said reference voltage as inputs and outputs a current signal, and a third capacitance element that converts the current signal output from said transconductance amplifier to a voltage signal.

17. The DC-DC converter described in claim 13 wherein said pulse width modulator has a comparator that compares said control voltage with a sawtooth signal and generates said pulse signal.

18. The DC-DC converter described in claim 16 wherein said pulse width modulator has a comparator that compares said control voltage with a sawtooth signal and generates said pulse signal.

* * * * *